(12) United States Patent
Okuno et al.

(10) Patent No.: US 9,353,813 B2
(45) Date of Patent: May 31, 2016

(54) WET BRAKE DEVICE

(75) Inventors: Naoyuki Okuno, Kasumigaura (JP);
Yutaka Komaru, Kasumigaura (JP);
Takashi Niidome, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 13/704,681

(22) PCT Filed: Sep. 29, 2011

(86) PCT No.: PCT/JP2011/072380
§ 371 (c)(1),
(2), (4) Date: Dec. 17, 2012

(87) PCT Pub. No.: WO2012/046623
PCT Pub. Date: Apr. 12, 2012

(65) Prior Publication Data
US 2013/0248303 A1 Sep. 26, 2013

(30) Foreign Application Priority Data

Oct. 4, 2010 (JP) ................................. 2010-224791

(51) Int. Cl.
*F16D 65/833* (2006.01)
*B60T 1/06* (2006.01)
*B60T 5/00* (2006.01)
(Continued)

(52) U.S. Cl.
CPC ............... *F16D 65/833* (2013.01); *B60T 1/062* (2013.01); *B60T 5/00* (2013.01); *B66C 23/86* (2013.01); *E02F 9/128* (2013.01); *F16D 55/36* (2013.01); *F16D 65/853* (2013.01); *H02K 7/102* (2013.01); *F16D 2055/0058* (2013.01); *F16D 2065/783* (2013.01); *F16D 2069/004* (2013.01); *F16D 2121/06* (2013.01); *H02K 7/116* (2013.01); *H02K 9/19* (2013.01)

(58) Field of Classification Search
CPC ..... F16D 65/853; F16D 65/833; B60T 1/062; B60T 5/00; B66C 23/86; E02F 9/128; H02K 7/102; H02K 7/116; H02K 9/19
See application file for complete search history.

(56) References Cited

U.S. PATENT DOCUMENTS 3,033,329 A * 5/1962 Malloy ..................... 188/264 E
3,580,369 A * 5/1971 Heck .......................... 188/264 E
(Continued)

FOREIGN PATENT DOCUMENTS

JP 2000-283191 A 10/2000
JP 2002-323072 A 11/2002
(Continued)

*Primary Examiner* — Xuan Lan Nguyen
(74) *Attorney, Agent, or Firm* — Mattingly & Malur, PC

(57) ABSTRACT

A plurality of rotating side brake disks and a plurality of non-rotating side brake disks are arranged outside in the radial direction from a motor shaft in a brake case while alternately overlapping with each other. A frictional material is provided on the non-rotating side brake disk, and an oil groove is provided in a frictional engaging surface of this frictional material. It is configured such that, when a braking force is applied by a brake piston to the motor shaft, lubricant oil flowing into the brake case from a lubricant oil inlet port flows from the outer diameter side to the inner diameter side between the rotating side brake disk and the non-rotating side brake disk only through the oil groove. As a result, the lubricant oil having flowed into the brake case efficiently cools the frictional engaging surface.

3 Claims, 11 Drawing Sheets

(51) Int. Cl.
*E02F 9/12* (2006.01)
*F16D 55/36* (2006.01)
*F16D 65/853* (2006.01)
*H02K 7/102* (2006.01)
*B66C 23/86* (2006.01)
*F16D 55/00* (2006.01)
*F16D 65/78* (2006.01)
*F16D 69/00* (2006.01)
*F16D 121/06* (2012.01)
*H02K 7/116* (2006.01)
*H02K 9/19* (2006.01)

(56) References Cited

U.S. PATENT DOCUMENTS

| | | | | |
|---|---|---|---|---|
| 4,269,289 | A * | 5/1981 | Winkler | 188/71.6 |
| 4,655,326 | A * | 4/1987 | Osenbaugh | 188/18 A |
| 6,189,669 | B1 * | 2/2001 | Kremer et al. | 192/70.12 |
| 2008/0029354 | A1 * | 2/2008 | Yoshimatsu et al. | 188/72.1 |
| 2013/0180809 | A1 * | 7/2013 | Yabuuchi et al. | 188/71.5 |

FOREIGN PATENT DOCUMENTS

| | | |
|---|---|---|
| JP | 2006-25580 A | 1/2006 |
| JP | 2006-199144 A | 8/2006 |
| JP | 2008-190634 A | 8/2008 |

* cited by examiner

WET BRAKE DEVICE

TECHNICAL FIELD

The present invention relates to a wet brake device used for a revolving apparatus equipped in a revolving type construction machine such as a hydraulic excavator, hydraulic crane and the like, for example, and applying a braking force to a rotational shaft.

BACKGROUND ART

In general, a hydraulic excavator as a typical example of a revolving type construction machine is largely constituted by an automotive lower traveling structure, an upper revolving structure that is rotatably mounted on the lower traveling structure through a swing circle, and a working mechanism provided on the front portion side of the upper revolving structure. A revolving apparatus is provided between the lower traveling structure and the upper revolving structure, and the upper revolving structure is configured to be revolved on the lower traveling structure by operating this revolving apparatus.

The revolving apparatus includes a reduction device which is mounted on the upper revolving structure and reduces a speed of input rotation and outputs a reduced rotation, a revolving motor such as an electric motor which is provided on the upper side of the reduction device and inputs rotation of a motor shaft to the reduction device, an output shaft which outputs the rotation of the motor shaft whose speed was reduced by the reduction device to the swing circle, and a wet brake device which applies a braking force to the rotation of the revolving motor.

The wet braking brake of the revolving apparatus largely constituted by a brake case in which the rotational shaft is rotatably fitted, a rotating side brake disk arranged outside in the radial direction from the rotational shaft in the brake case, a non-rotating side brake disk arranged in the brake case in a state overlapping with the rotating side brake disk, a brake piston which applies a braking force to the rotational shaft by pressing the rotating side brake disk and the non-rotating side brake disk so as to frictionally engage them with each other, a lubricant oil inlet port provided in the brake case and into which lubricant oil flows, and a lubricant oil outlet port provided in the brake case and from which the lubricant oil therein flows out (Patent Document 1).

PRIOR ART DOCUMENT

Patent Document

Patent Document 1: Japanese Patent Laid-Open No. 2006-25580 A

SUMMARY OF THE INVENTION

In the above-described conventional art, the rotating side brake disk and the non-rotating side brake disk are configured to be cooled by supplying the lubricant oil from the lubricant oil inlet port provided in the brake case toward a portion on the outer diameter sides of the rotating side brake disk and the non-rotating side brake disk.

However, the above-described conventional art has a problem that a frictional engaging surface between the rotating side brake disk and the non-rotating side brake disk cannot sufficiently cooled at the time of rapid braking for braking the rotational shaft rotating at a high load and a high speed, an emergency stop and the like, for example.

That is, in the above-described conventional art, a horizontal oil path penetrating between an inner peripheral surface and an outer peripheral surface in the radial direction is provided in the non-rotating side brake disk (fixed disk) formed annularly and a through hole penetrating in the radial direction is also provided in a piston pressing the brake disk.

Thus, most of the lubricant oil supplied toward the portion on the outer diameter sides of the rotating side brake disk and the non-rotating side brake disk from the lubricant oil inlet port flows through the horizontal oil path in the non-rotating side brake disk and the through hole of the piston, and it is concerned that an amount of the lubricant oil distributing through the frictional engaging surface between the rotating side brake disk and the non-rotating side brake disk lowers.

Moreover, at the rapid braking, a centrifugal force based on the rotation of the rotating side brake disk acts on the lubricant oil, the lubricant oil is pushed out from the frictional engaging surface toward the outer diameter side, whereby the amount of the lubricant oil distributing through the frictional engaging surface further lowers, and it is concerned that the frictional engaging surface cannot be fully cooled.

In view of the above-discussed problems with the conventional art, it is an object of the present invention to provide a wet braking brake which can efficiently cool the frictional engaging surface between the rotating side brake disk and the non-rotating side brake disk.

(1) In order to solve the above problem, the present invention is applied to a wet brake device comprising a brake case in which a rotational shaft is rotatably fitted; a plurality of rotating side brake disks arranged outside in a radial direction from the rotational shaft in the brake case and rotating together with the rotational shaft; a plurality of non-rotating side brake disks arranged in a non-rotating state in the brake case while alternately overlapping with each of the rotating side brake disks; a brake piston which applies a braking force to the rotational shaft by pressing the rotating side brake disk and the non-rotating side brake disk and frictionally engage them with each other; a lubricant oil inlet port provided in the brake case and into which lubricant oil flows; and a lubricant oil outlet port provided in the brake case and from which the lubricant oil inside flows out.

The characteristic of the construction adopted in the present invention is that the lubricant oil inlet port is for inflow of the lubricant oil toward a portion on the outer diameter sides of the rotating side brake disk and the non-rotating side brake disk; the lubricant oil outlet port is for outflow of the lubricant oil which is discharged from a portion on the inner diameter sides of the rotating side brake disk and the non-rotating side brake disk, to the outside of the brake case; an oil groove through which the lubricant oil flows from the outer diameter side to the inner diameter side of the rotating side brake disk and the non-rotating side brake disk is provided on a frictional engaging surface on at least one of the rotating side brake disk and the non-rotating side brake disk; and the lubricant oil flowing into the brake case from the lubricant oil inlet port when a braking force is applied by the brake piston to the rotational shaft flows from the outer diameter side to the inner diameter side between the rotating side brake disk and the non-rotating side brake disk only through the oil groove.

With this arrangement, when the braking force is applied by the brake piston to the rotational shaft, the lubricant oil flowing into the brake case from the lubricant oil inlet port flows from the outer diameter side to the inner diameter side between the rotating side brake disk and the non-rotating side brake disk only through the oil groove provided in the frictional engaging surface between the rotating side brake disk and the non-rotating side brake disk, and the frictional engaging surface during braking can be cooled efficiently.

That is, when the braking force is applied, since the lubricant oil having flowed into the brake case from the lubricant oil inlet port flows only through the oil groove provided in the frictional engaging surface, inflow of the lubricant oil into a portion other than the frictional engaging surface can be suppressed. Thus, the lubricant oil having flowed into the brake case from the lubricant oil inlet port actively cools the frictional engaging surface between the rotating side brake disk and the non-rotating side brake disk, and thus, the frictional engaging surface can be cooled efficiently. As a result, durability and reliability of the rotating side brake disk and the non-rotating side brake disk can be ensured, and improvement of brake performance and reliability can be realized.

(2) The present invention is configured such that the lubricant oil flowing into the brake case from the lubricant oil inlet port is return oil of operating oil having driven a hydraulic actuator and in a pressurized state and the lubricant oil flows from the outer diameter side to the inner diameter side between the rotating side brake disk and the non-rotating side brake disk in the pressurized state.

With this arrangement, even if a centrifugal force is applied to the lubricant oil passing through the frictional engaging surface with rotation of the rotating side brake disk, the lubricant oil can be made to forcedly flow from the outer diameter side to the inner diameter side against this centrifugal force between the rotating side brake disk and the non-rotating side brake disk. Thus, the frictional engaging surface can be cooled further efficiently, and ensuring of durability and reliability and improvement of brake performance and reliability can be further realized.

(3) The present invention is configured such that a frictional material which is frictionally engaged with the rotating side brake disk is provided on the non-rotating side brake disk, and the oil groove is provided in the frictional material.

With this arrangement, since the frictional material is provided only on the non-rotating side brake disk which does not rotate and the oil groove is provided in the frictional material, the centrifugal force is not directly applied to the lubricant oil flowing through the oil groove, and the lubricant oil can be made to efficiently flow from the outer diameter side to the inner diameter side of the rotating side brake disk and the non-rotating side brake disk. Thus, regardless of the rotation speed of the rotational shaft, the cooling effect by the lubricant oil on the frictional engaging surface can be improved, and from this viewpoint, too, durability and reliability of the rotating side brake disk and the non-rotating side brake disk can be improved.

(4) The present invention is configured such that a large-diameter hole having a diameter larger than a shaft diameter of the rotational shaft is provided in a portion on the inner diameter side and the frictional material is provided on a portion on the outer side in the radial direction from the position of the large-diameter hole in the non-rotating side brake disk; an engaging hole to be engaged with the rotational shaft is provided in a portion on the inner diameter side and a through hole through which the lubricant oil flows is provided in a frictional material non-contact surface between the portion on the outer side in the radial direction in contact with the frictional material and the engaging hole in the rotating side brake disk.

With this configuration, since the large-diameter hole is provided in the portion on the inner diameter side of the non-rotating side brake disk and the through hole is provided in the non-contact surface of the frictional material of the rotating side brake disk, the lubricant oil can be made to flow efficiently from the inner diameter side of the rotating side brake disk and the non-rotating side brake disk to the lubricant oil outlet port through the large-diameter hole and the through hole.

(5) The present invention is configured such that the rotational shaft extends in the vertical direction in the brake case; and the non-rotating side brake disk is arranged opposing the rotating side brake disk in the vertical direction.

With this arrangement, since the rotational shaft extends in the vertical direction in the brake case, the lubricant oil having flowed into the brake case from the lubricant oil inlet port flows in the horizontal direction on the frictional engaging surface between the rotating side brake disk and the non-rotating side brake disk and can efficiently cool the whole periphery of the frictional engaging surface.

(6) The present invention is configured such that the rotational shaft is a motor shaft of an electric motor provided on the lower side of the brake case; and the electric motor is provided on the upper side of a reduction device which reduces the rotation speed of the motor shaft.

With this configuration, the wet brake device can be used suitably if it is used for a revolving apparatus formed of the wet brake device, the electric motor, and the reduction device.

MODE FOR CARRYING OUT THE INVENTION

Figure 1:
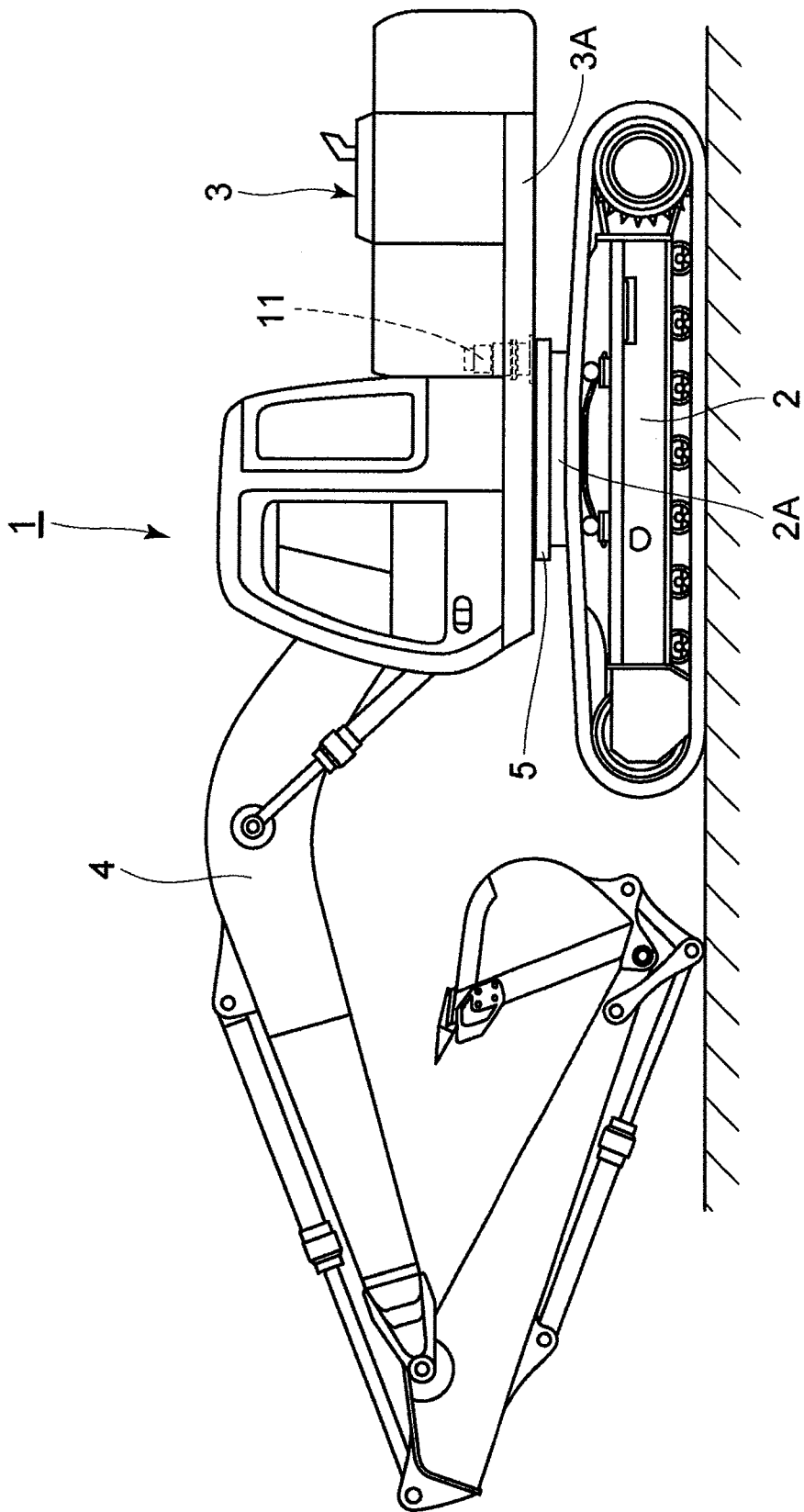
FIG. 1 is a front view illustrating a hydraulic excavator to which a wet brake device according to an embodiment of the present invention is applied.
Figure 2:
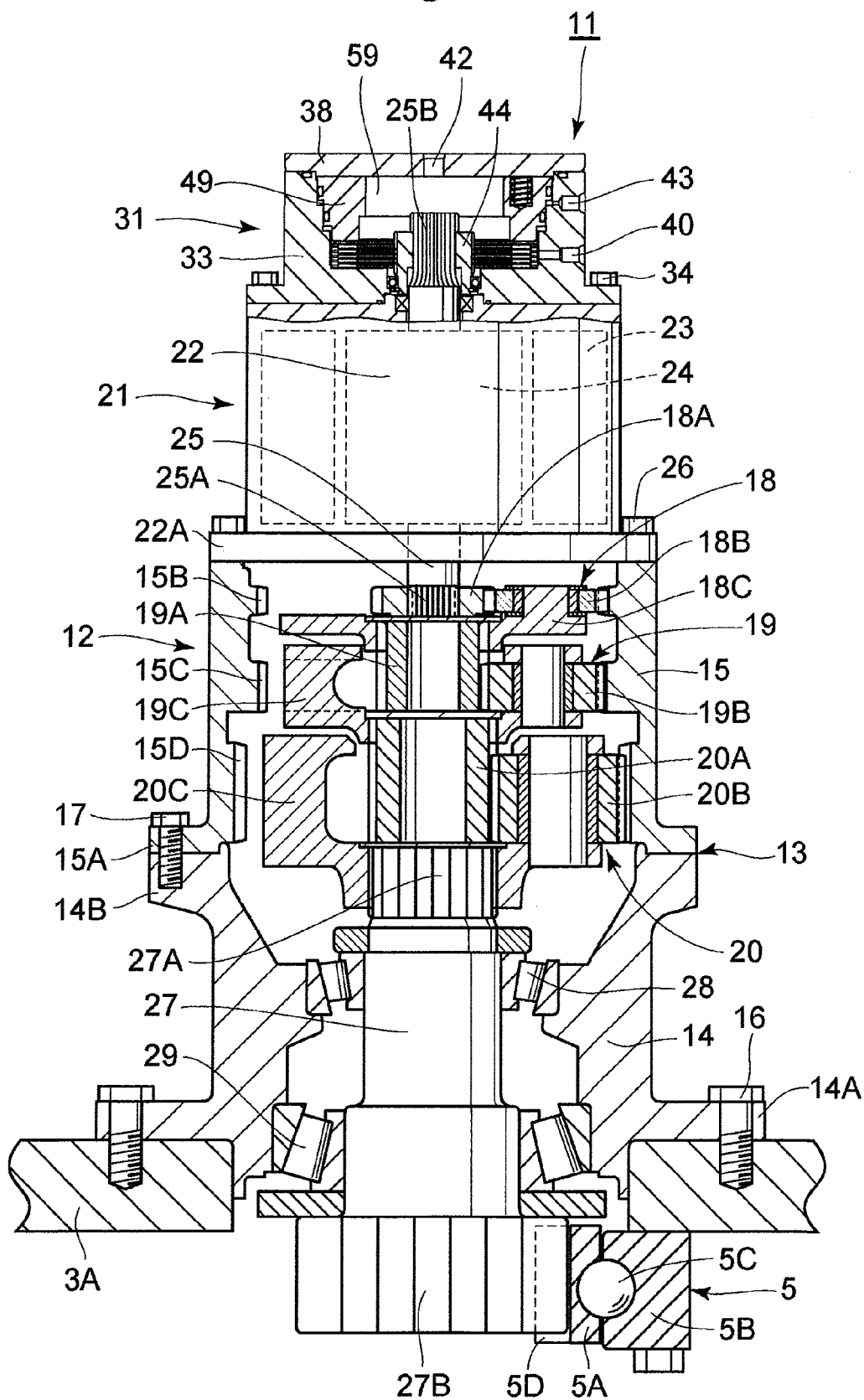
FIG. 2 is a longitudinal sectional view of an essential part illustrating a revolving apparatus provided with the wet brake device according to the embodiment of the present invention.

Hereafter, an embodiment of a wet brake device according to the present invention will be in detail explained with reference to the accompanying drawings FIG. 1 to FIG. 10, by taking a case in which the wet brake device is applied to a revolving apparatus equipped in a hydraulic excavator as an example.

In Figures, designated at 1 is a hydraulic excavator which is a typical example of a revolving type construction machine, and the hydraulic excavator 1 is formed of an automotive crawler-type lower traveling structure 2 and an upper revolving structure 3 rotatably mounted on the lower traveling structure 2. On the front portion side of the upper revolving structure 3, a working mechanism 4 is liftably provided. A swing circle 5, which will be described later, is provided between the lower traveling structure 2 and the upper revolving structure 3, and the upper revolving structure 3 is rotatably supported on the lower traveling structure 2 through the swing circle 5.

The swing circle 5 is provided between the lower traveling structure 2 and the upper revolving structure 3, and the swing circle 5 is constituted by an inner race 5A fixed onto a circle member 2A of the lower traveling structure 2, an outer race 5B fixed on the lower surface side of a revolving frame 3A which becomes a base of the upper revolving structure 3, and a large number of steel balls 5C (only one of them is shown) provided between the inner race 5A and the outer race 5B. On an inner peripheral side of the inner race 5A, internal teeth 5D are formed on the whole periphery. Here, when a revolving apparatus 11, which will be described later, is operated and the outer race 5B fixed to the revolving frame 3A rotates around the inner race 5A, the upper revolving structure 3 is configured to perform a revolving operation on the lower traveling structure 2.

Subsequently, the revolving apparatus 11 applied to this embodiment will be described.

That is, designated at 11 is a revolving apparatus which revolves the upper revolving structure 3 mounted on the lower traveling structure 2 through the swing circle 5, and the revolving apparatus 11 is constituted by a reduction device 12, an electric motor 21, an output shaft 27, a wet brake device 31, and the like, which will be described later.

Designated at 12 is the reduction device mounted on the revolving frame 3A of the upper revolving structure 3, and the reduction device 12 reduces a speed of input rotation inputted from the electric motor 21, which will be described later, and outputs it to the output shaft 27, which will be described later. Here, the reduction device 12 is largely constituted by a housing 13, a first-stage planetary gear reduction mechanism 18, a second-stage planetary gear reduction mechanism 19, and a third-stage planetary gear reduction mechanism 20, which will be described later.

The housing 13 forms an outer shell of the reduction device 12, and the housing 13 is constituted by a cylindrical lower housing 14 mounted on the upper surface side of the revolving frame 3A and a cylindrical upper housing 15 mounted on the upper end side of the lower housing 14, and the housing 13 extends upwardly (vertical direction) from the upper face of the revolving frame 3A. Here, on the both end sides in the vertical direction of the lower housing 14, a large-diameter disk-shaped lower flange portion 14A and upper flange portion 14B are provided respectively. The lower flange portion 14A is fixed to the revolving frame 3A by using a bolt 16, while the upper housing 15 is mounted on the upper flange portion 14B.

A large-diameter disk-shaped lower flange portion 15A is provided on the lower end side of the upper housing 15, and the lower flange portion 15A is fixed to the upper flange portion 14B of the lower housing 14 by using a bolt 17. On the upper end side of the upper housing 15, the electric motor 21, which will be described later, is mounted. Moreover, on the inner peripheral side of the upper housing 15, three internal gears 15B, 15C, and 15D are formed separately in the vertical direction over the whole periphery.

The first-stage planetary gear reduction mechanism 18 is disposed in the upper housing 15. This planetary gear reduction mechanism 18 includes a sun gear 18A which is splined to a motor shaft 25 of the electric motor 21, which will be described later, a plurality of planetary gears 18B (only one of them is shown) meshed with the sun gear 18A and the internal gear 15B of the upper housing 15 and revolving around the sun gear 18A while rotating, and a carrier 18C which rotatably supports each of the planetary gears 18B.

The second-stage planetary gear reduction mechanism 19 is disposed on the lower side of the planetary gear reduction mechanism 18. This planetary gear reduction mechanism 19 includes a sun gear 19A splined to the carrier 18C of the first-stage planetary gear reduction mechanism 18, a plurality of planetary gears 19B meshed with the sun gear 19A and the internal gear 15C of the upper housing 15 and revolving around the sun gear 19A while rotating, and a carrier 19C which rotatably supports each of the planetary gears 19B.

The third-stage (last stage) planetary gear reduction mechanism 20 is disposed on the lower side of the planetary gear reduction mechanism 19. This planetary gear reduction mechanism 20 includes a sun gear 20A which is splined to the carrier 19C of the second-stage planetary gear reduction mechanism 19 and a plurality of planetary gears 20B meshed with the sun gear 20A and the internal gear 15D of the upper housing 15 and revolving around the sun gear 20A while rotating, and a carrier 20C which rotatably supports each of the planetary gears 20B. The carrier 20C of the planetary gear reduction mechanism 20 is configured to be splined to the upper end side of the output shaft 27, which will be described later.

Designated at 21 is the electric motor provided on the upper side of the reduction device 12, and the electric motor 21 is a rotation source for driving the output shaft 27, which will be described later. Here, the electric motor 21 is largely constituted by a cylindrical motor case 22 on which a large-diameter lower flange portion 22A is provided on the lower end side, a stator 23 fixed and provided, and a rotor 24 rotatably provided, in the motor case 22, and the motor shaft 25 as a rotational shaft integrally rotating with the rotor 24.

In this case, a shaft through hole 22B penetrating in the axial direction (vertical direction) is formed in the center part on the upper end side of the motor case 22, and a seal fitting portion 22C having a bottom with which an oil seal 56, which will be described later, is fitted is provided surrounding the shaft through hole 22B. Then, by fixing the lower flange portion 22A of the motor case 22 to the upper end portion of the upper housing 15 by using a bolt 26, the electric motor 21 is mounted on the upper end side of the reduction device 12.

Figure 3:
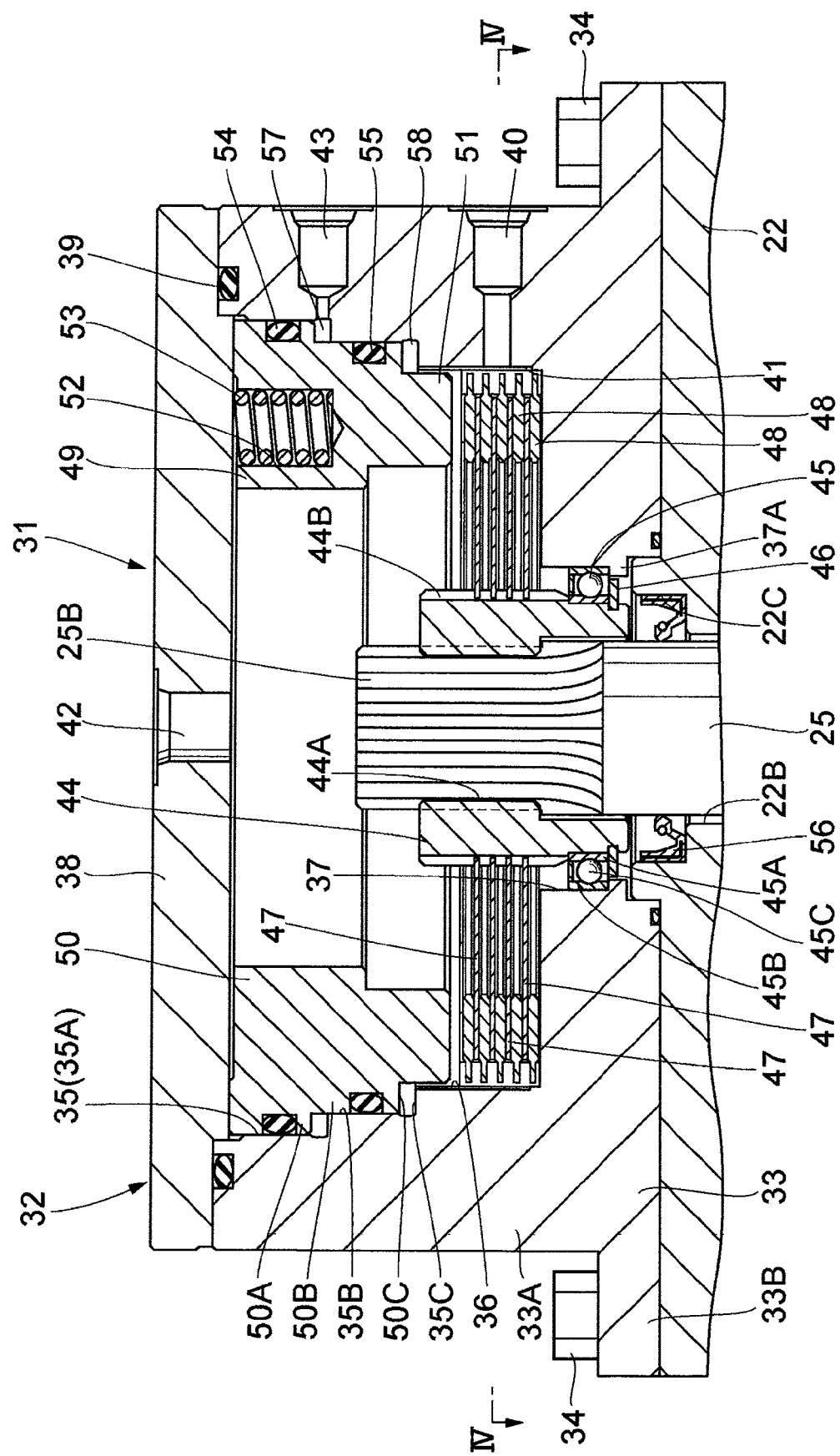
FIG. 3 is an enlarged sectional view illustrating the wet brake device in FIG. 2 in a state in which braking is released.
Figure 4:
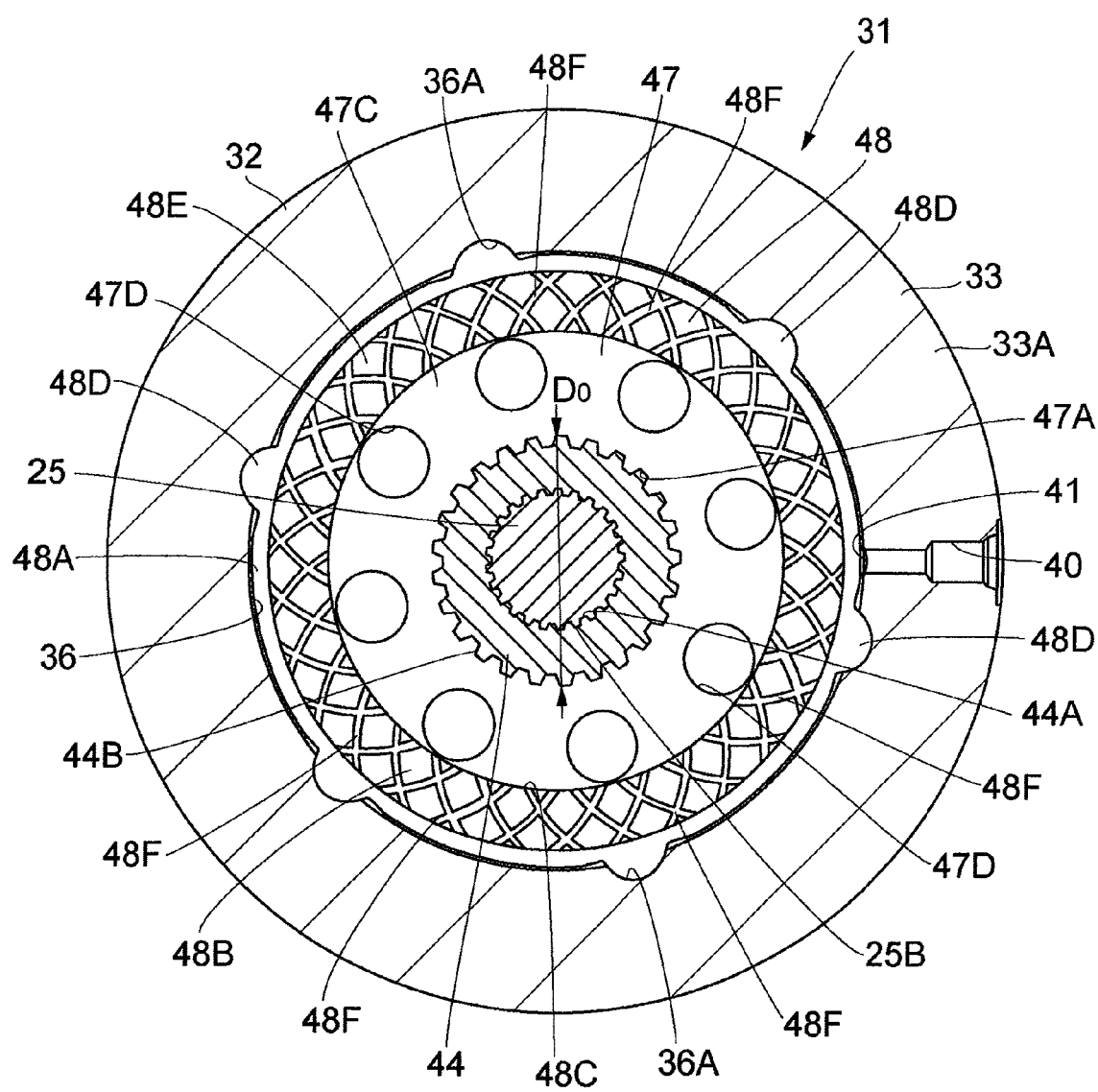
FIG. 4 is a cross sectional view illustrating the wet brake device taken from the direction of arrows IV-IV in FIG. 3.
Figure 5:
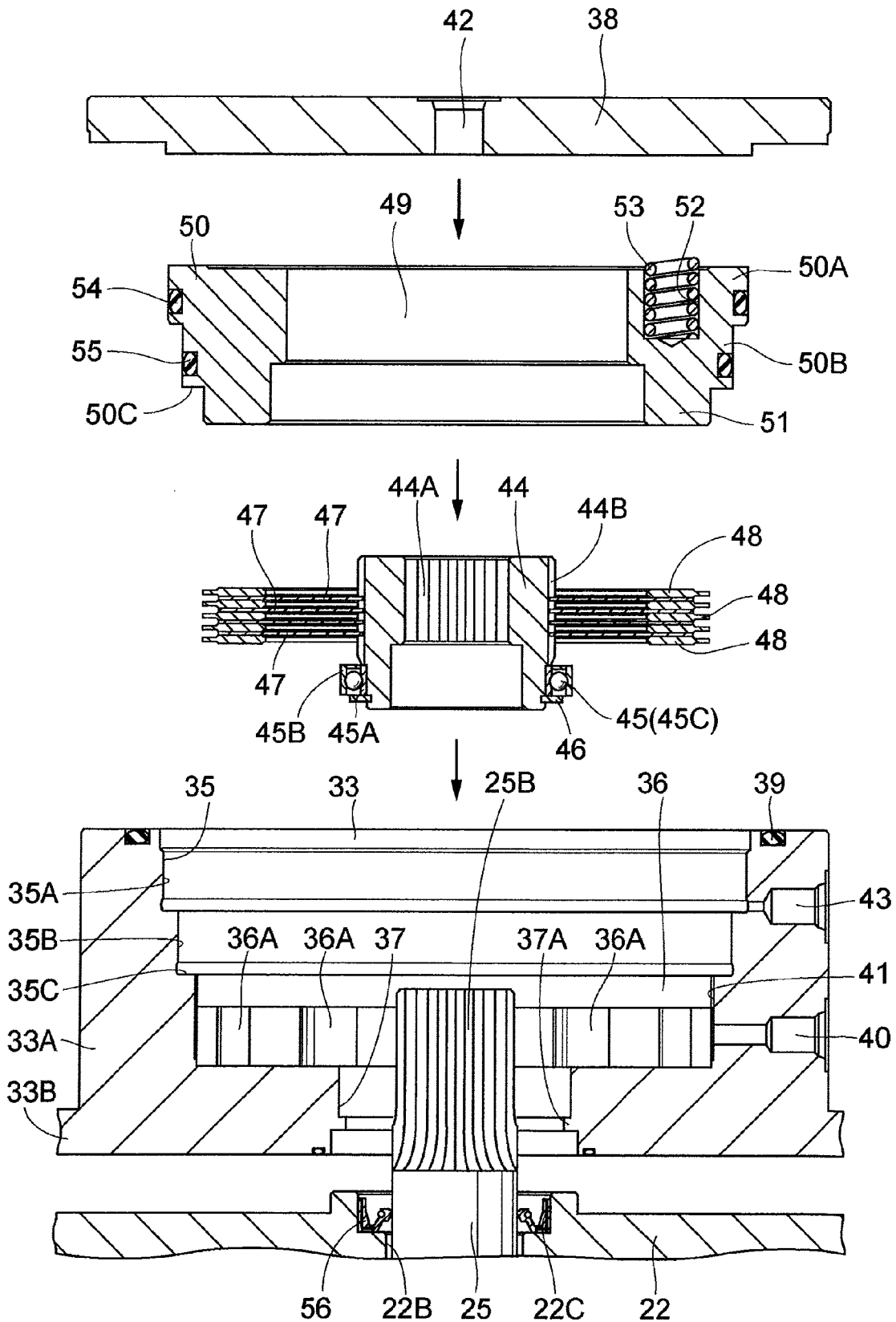
FIG. 5 is an exploded sectional view illustrating an assembled state of the wet brake device.

On the other hand, the upper end side of the motor shaft 25 protrudes to the outside through the shaft through hole 22B of the motor case 22. A lower male spline portion 25A is formed over the whole periphery on the lower end side of the motor shaft 25, and an upper male spline portion 25B is formed over the whole periphery on the upper end side of the motor shaft 25. In a state in which the electric motor 21 is mounted on the upper end side of the reduction device 12, the lower male spline portion 25A of the motor shaft 25 protrudes into the upper housing 15 and is splined to the sun gear 18A of the first-stage planetary gear reduction mechanism 18. On the other hand, as illustrated in FIG. 3, the upper male spline portion 25B of the motor shaft 25 protrudes into a brake case 32, which will be described later, and extends in the vertical direction in the brake case 32.

The output shaft 27 is rotatably provided in the housing 13. This output shaft 27 is rotatably supported in the lower housing 14 through an upper bearing 28 and a lower bearing 29 and extends in the vertical direction (axial direction) in the housing 13. Here, a male spline portion 27A is formed on the upper end side of the output shaft 27, and the male spline portion 27A is splined to the carrier 20C of the third-stage planetary gear reduction mechanism 20. On the other hand, a pinion 27B is integrally provided on the lower end side of the output shaft 27, and the pinion 27B protrudes downward from the lower end portion of the lower housing 14 and meshed with the internal teeth 5D provided on the inner race 5A of the swing circle 5.

Therefore, the rotation of the motor shaft 25 of the electric motor 21 is transmitted to the output shaft 27 in a state reduced in three stages by the planetary gear reduction mechanisms 18, 19, and 20, and the output shaft 27 is rotated at a low speed with a large rotational force (torque). As a result, the pinion 27B of the output shaft 27 revolves along the inner race 5A while being meshed with the internal teeth 5D of the swing circle 5, and this revolving force of the pinion 27B is transmitted to the revolving frame 3A through the housing 13, whereby the upper revolving structure 3 illustrated in FIG. 1 is configured to perform a revolving operation on the lower traveling structure 2.

Subsequently, the wet brake device 31 according to this embodiment will be described.

That is, designated at 31 is the wet brake device disposed on the upper end side of the electric motor 21, and the wet brake device 31 is formed of a negative-type brake device which applies a braking force to rotation of the motor shaft 25 of the electric motor 21. As illustrated in FIGS. 3 to 6 and the like, the wet brake device 31 includes the brake case 32, a lubricant oil inlet port 40, a lubricant oil outlet port 42, a rotating side brake disk 47, a non-rotating side brake disk 48, a brake piston 49, a spring member 53, a brake release oil chamber 57 and the like, which will be described later.

The brake case 32 forms an outer shell of the wet brake device 31, and the brake case 32 has the upper end portion of the motor shaft 25 as a rotational shaft fitted (inserted) rotatably therein. Here, the brake case 32 is largely constituted by a case body 33 and a lid member 38, which will be described later.

The case body 33 accommodates the rotating side brake disk 47, the non-rotating side brake disk 48, the brake piston 49 and the like and is formed as a stepped cylindrical body as a whole. This case body 33 is constituted by a stepped cylinder-shaped cylindrical portion 33A having an opening end on the upper end side closed by a lid member 38, which will be described later, and a disk-shaped flange portion 33B provided on the lower end side of the cylindrical portion 33A. By fixing the flange portion 33B of the case body 33 to the upper end portion of the motor case 22 constituting the electric motor 21 by using a bolt 34, the case body 33 is detachably attached to the upper end side of the electric motor 21.

In a piston insertion hole 35, the brake piston 49, which will be described later, is slidably inserted, and the piston insertion hole 35 forms the cylindrical portion 33A of the case body 33 along with a brake disk accommodating hole 36, which will be described later. Here, the piston insertion hole 35 is constituted by a large-diameter hole portion 35A located on the opening end side, a small-diameter hole portion 35B located below the large-diameter hole portion 35A and having an inner diameter smaller than the large-diameter hole portion 35A and a stepped portion 35C continuing to the small-diameter hole portion 35B and the opening end of the brake disk accommodating hole 36.

The brake disk accommodating hole 36 accommodates the rotating side brake disk 47 and the non-rotating side brake disk 48, which will be described later. This brake disk accommodating hole 36 extends in the axial direction with a hole diameter smaller than the piston insertion hole 35 from the stepped portion 35C formed on the bottom part of the piston insertion hole 35 and is formed in the case body 33 as a bottomed annular hole. On an inner peripheral surface of the brake disk accommodating hole 36, a plurality of engaging recessed grooves 36A extending in the axial direction are formed in the circumferential direction with predetermined intervals (equal intervals), and an engaging projecting portion 48D of the non-rotating side brake disk 48 is engaged with the engaging recessed groove 36A.

A shaft through hole 37 is provided below the brake disk accommodating hole 36 in the case body 33, and in the shaft through hole 37, the upper male spline portion 25B of the motor shaft 25 and an adapter 44, which will be described later, are inserted. Here, an annular bearing mounting portion 37A on which a bearing 45, which will be described later, is mounted is projected inward in the radial direction on the shaft through hole 37.

The lid member 38 closes the opening end of the cylindrical portion 33A of the case body 33 and is formed having a disk shape. This lid member 38 is detachably attached to the upper end side of the case body 33 by using a bolt or the like (not shown). An annular seal 39 which seals a space between the lid member 38 and the opening end of the case body 33 in a liquid-tight manner is provided between the both.

The lubricant oil inlet port 40 is provided in the brake disk accommodating hole 36 in the case body 33, and the lubricant oil inlet port 40 makes lubricant oil 59, which will be described later, flow into the brake case 32. Here, the lubricant oil inlet port 40 is opened at a position opposing to the portion on the outer diameter sides of the rotating side brake disk 47 and the non-rotating side brake disk 48 in the brake disk accommodating hole 36. As a result, it is configured such that the lubricant oil 59 from the outside of the brake case 32 flows in toward the portion on the outer diameter sides of the rotating side brake disk 47 and the non-rotating side brake disk 48 through the lubricant oil inlet port 40.

An oil groove 41 is provided at a portion corresponding to the lubricant oil inlet port 40 in the brake disk accommodating hole 36 and formed as an oil groove extending in the vertical direction on the inner peripheral surface of the brake disk accommodating hole 36. Then, it is configured such that the lubricant oil 59 uniformly flows through the portion on the outer diameter sides of each of the rotating side brake disks 47 and each of the non-rotating side brake disks 48 overlapping with each other vertically by this oil groove 41.

The lubricant oil outlet port 42 is provided at the center part of the lid member 38, and the lubricant oil outlet port 42 makes the lubricant oil 59 supplied into the brake case 32 through the lubricant oil inlet port 40 and discharged from the portion on the inner diameter sides of the rotating side brake disk 47 and the non-rotating side brake disk 48 flow to the outside of the brake case 32.

A brake release pressure inlet port 43 is provided at a portion corresponding to the piston insertion hole 35 in the case body 33, and the brake release pressure inlet port 43 is opened in a brake release oil chamber 57, which will be described later. Here, since pressurized oil is supplied to the brake release oil chamber 57 through the brake release pressure inlet port 43, the brake piston 49, which will be described later, is configured to be spaced apart from the rotating side brake disk 47 and the like against the spring member 53 and to release braking to the motor shaft 25 of the electric motor 21.

The adapter 44 is detachably attached to the upper end side of the motor shaft 25 inserted into the brake case 32. This adapter 44 is formed having a cylindrical shape, and a female spline portion 44A splined to the upper male spline portion 25B of the motor shaft 25 is formed on the inner peripheral side thereof. On the other hand, a male spline portion 44B extending in the axial direction is formed over the whole periphery on the outer peripheral side of the adapter 44, and a female spline portion 47A of the rotating side brake disk 47 is engaged with this male spline portion 44B.

The bearing 45 is provided between the adapter 44 and the brake case 32, and the bearing 45 rotatably supports the adapter 44 with respect to the case body 33 of the brake case 32. Here, the bearing 45 is constituted by an inner race 45A fitted in the outer periphery on the lower end side of the adapter 44, an outer race 45B attached to the shaft through hole 37 of the case body 33 through the bearing mounting portion 37A, and a plurality of steel balls 45C provided between the inner race 45A and the outer race 45B. The lower end side of the inner race 45A is supported by a stop ring 46 attached to the outer peripheral side of the adapter 44.

Subsequently, the rotating side brake disk 47 and the non-rotating side brake disk 48 will be described.

That is, designated at 47 is a plurality of rotating side brake disks arranged on the outer side in the radial direction from the motor shaft 25 in the brake case 32. The rotating side brake disk 47 is formed as an annular plate body made of a metal material such as a steel material, for example, and is accommodated in the brake disk accommodating hole 36 of the case body 33 in a state of overlapping each other in the axial direction (vertical direction) with each of the non-rotating side brake disks 48, which will be described later.

Here, the female spline portion 47A as an engaging hole is provided at a portion on the inner diameter side (center part) of the rotating side brake disk 47 and engages with the male spline portion 44B of the adapter 44 attached to the motor shaft 25 movably in the axial direction. As a result, the rotating side brake disk 47 is configured to rotate integrally with the motor shaft 25 through the adapter 44 movably in the axial direction with respect to the adapter 44.

Figure 10:
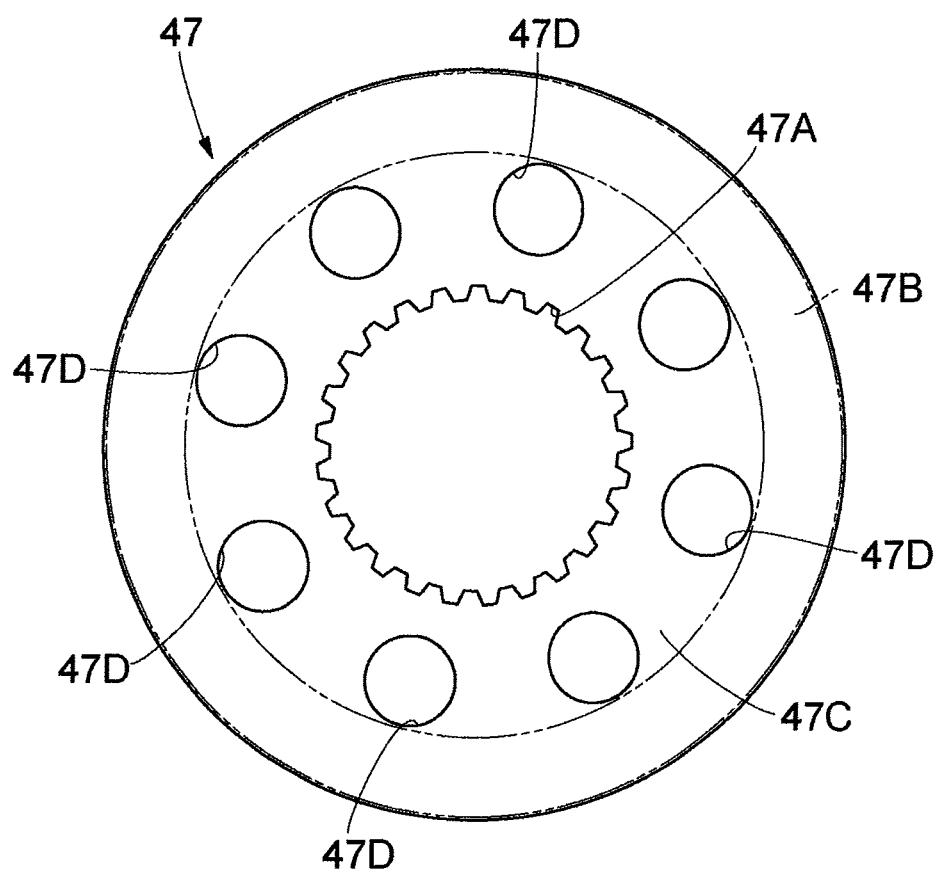
FIG. 10 is a plan view illustrating the rotating side brake disk in a single unit.

As illustrated in FIG. 10, the outer side portion in the radial direction of the rotating side brake disk 47 becomes an abutting portion 47B with which a frictional material 48B of the non-rotating side brake disk 48 is brought into contact, and a space between the abutting portion 47B and the female spline portion 47A is a frictional material non-contact surface 47C with which the frictional material 48B is not brought into contact. A plurality of through holes 47D penetrating in the vertical direction are provided in the frictional material non-contact surface 47C.

Here, the lubricant oil 59 is supplied into the case body 33 through the lubricant oil inlet port 40 and flows from the outer diameter side to the inner diameter side between the rotating side brake disk 47 and the non-rotating side brake disk 48 through an oil groove 48F in the frictional material 48B. Each of the through holes 47D makes the lubricant oil 59 flow in the upward direction toward the lubricant oil outlet port 42. As a result, the lubricant oil 59 having flowed to the inner diameter sides of the rotating side brake disk 47 and the non-rotating side brake disk 48 can be made to flow efficiently to the lubricant oil outlet port 42 through each of the through holes 47D of the rotating side brake disk 47 and a large-diameter hole 48C of the non-rotating side brake disk 48, which will be described later.

Designated at 48 is a plurality of non-rotating side brake disks arranged in the brake case 32 while alternately overlapping with each of the rotating side brake disks 47. This non-rotating side brake disk 48 is accommodated in the brake disk accommodating hole 36 of the case body 33 in a state arranged opposite to each of the rotating side brake disks 47 in the vertical direction. The non-rotating side brake disk 48 is constituted by a base 48A formed as an annular plate body made of a metal material such as a steel material, for example, and a pair of the frictional materials 48B which are provided on the both side faces in the axial direction (vertical direction) of the base 48A and generate a braking force with that and the rotating side brake disk 47.

Here, at a portion on the inner diameter side (center part) of the base 48A, the large-diameter hole 48C having an inner diameter D1 larger than a shaft diameter D0 (See FIG. 4) of the adapter 44 engaged with the motor shaft 25 is provided. On the other hand, at a portion on the outer diameter side (outer peripheral edge portion) of the base 48A, engaging projecting portions 48D, each being engaged with the engaging recessed groove 36A formed in the inner peripheral surface of the brake disk accommodating hole 36, are formed with predetermined intervals (equal intervals) in the circumferential direction. Each of the non-rotating side brake disks 48 is made movable in the axial direction with respect to the brake case 32 by means of the engagement between each of the engaging projecting portions 48D and each of the engaging recessed grooves 36A and is made non-rotatable with respect to the brake case 32.

Figure 8:
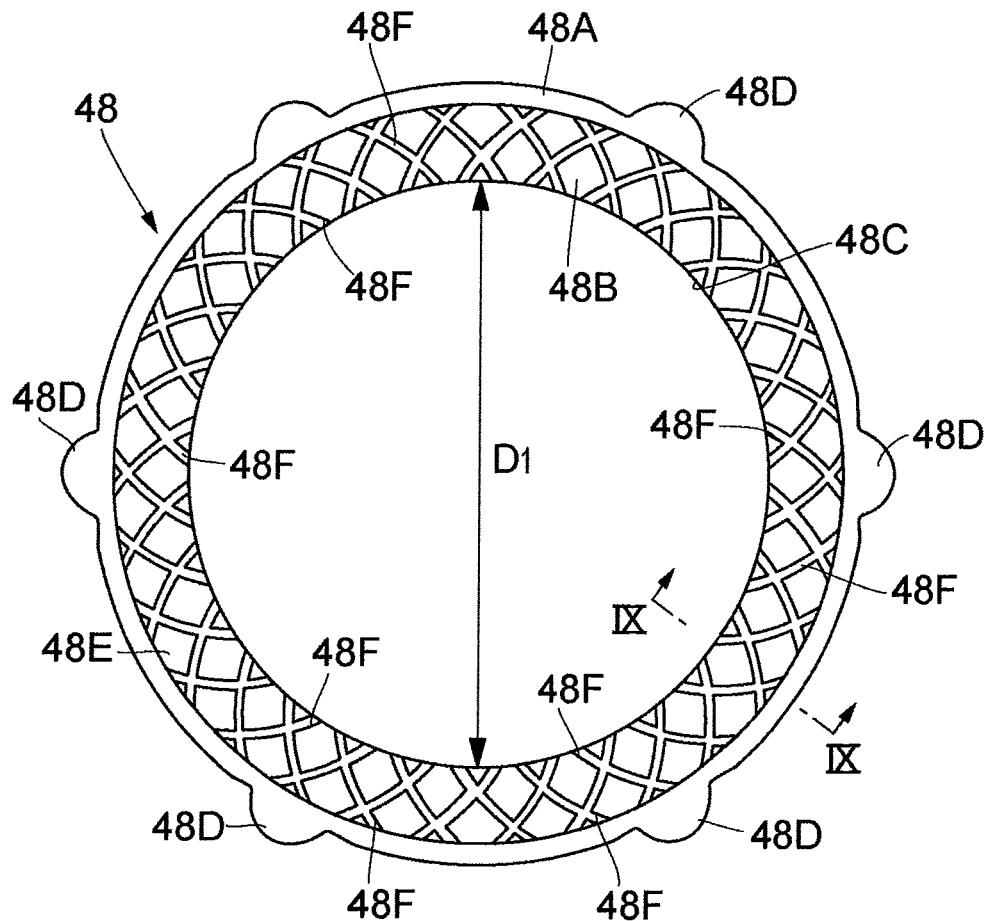
FIG. 8 is a plan view illustrating the non-rotating side brake disk in a single unit.
Figure 9:
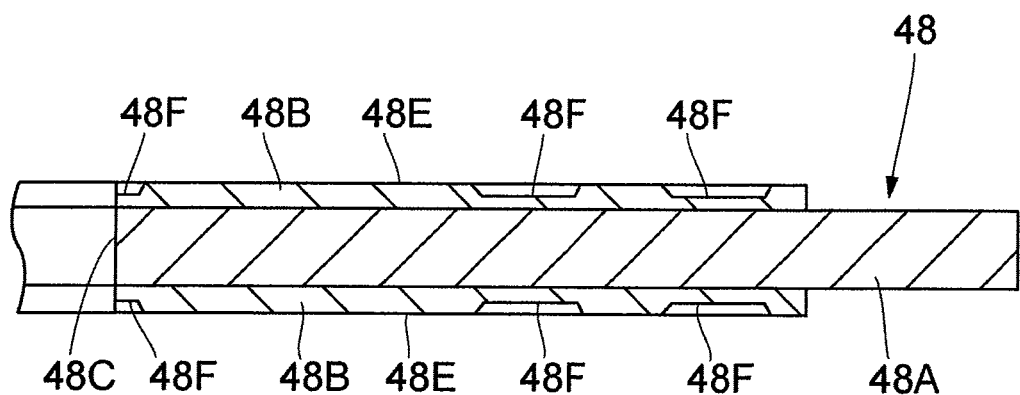
FIG. 9 is an enlarged sectional view illustrating the non-rotating side brake disk taken from the direction of arrows IX-IX in FIG. 8.

The frictional material 48B is formed annularly by a material such as ceramic, sintered alloy, paper, rubber, resin and the like, for example, and is fixed to a portion on the outer diameter side from the large-diameter hole 48C on the both side faces in the axial direction of the base 48A. Here, in this embodiment, as illustrated in FIGS. 8 and 9 and the like, the inner diameter D1 of the large-diameter hole 48C is made equal to the inner diameter D1 of the frictional material 48B.

On the other hand, in a frictional engaging surface 48E in contact with the abutting portion 47B of the rotating side brake disk 47 in the frictional material 48B, a plurality of oil grooves 48F called "sunburst groove" inclined in an arc shape in the circumferential direction are provided. By means of each of the oil grooves 48F, it is configured such that the lubricant oil 59 having flowed into the brake case 32 from the lubricant oil inlet port 40 flows from the outer diameter side to the inner diameter side between each of the rotating side brake disks 47 and each of the non-rotating side brake disks 48.

Here, in this embodiment, when a braking force is applied by the brake piston 49 to the motor shaft 25, it is configured such that the lubricant oil 59 flowing into the brake case 32 from the lubricant oil inlet port 40 flows from the outer diameter side to the inner diameter side between the rotating side brake disk 47 and the non-rotating side brake disk 48 only through each of the oil grooves 48F of the frictional material 48B. Therefore, in this embodiment, when the rotating side brake disk 47 is frictionally engaged with the non-rotating side brake disk 48 by the brake piston 49, an oil path formed between the rotating side brake disk 47 and the non-rotating side brake disk 48 in the brake case 32 is only each of the oil grooves 48F provided in the frictional engaging surface 48E of the frictional material 48B in the non-rotating side brake disk 48.

Subsequently, designated at 49 is the brake piston slidably inserted in the axial direction in the piston insertion hole 35 of the brake case 32 (case body 33). This brake piston 49 applies a braking force to the motor shaft 25 by pressing the rotating side brake disk 47 and the non-rotating side brake disk 48 and frictionally engaging them with each other. Here, the brake piston 49 is formed having a stepped cylindrical shape and largely constituted by a piston body portion 50, a pressing portion 51, and a spring accommodating hole 52, which will be described later.

The piston body portion 50 is slidably inserted into the piston insertion hole 35. This piston body portion 50 is constituted by a large-diameter cylinder portion 50A inserted into the large-diameter hole portion 35A of the piston insertion hole 35, a small-diameter cylinder portion 50B inserted into the small-diameter hole portion 35B of the piston insertion hole 35, and a bottom surface 50C on which the pressing portion 51 is projected.

The pressing portion 51 presses the rotating side brake disk 47 and the non-rotating side brake disk 48, and the pressing portion 51 is formed having a diameter smaller than the small-diameter cylinder portion 50B of the piston body portion 50 and projects into the brake disk accommodating hole 36 from the bottom surface 50C of the small-diameter cylinder portion 50B.

The spring accommodating hole 52 is provided in plural (only one of them is shown) separately in the circumferential direction on the upper end side of the brake piston 49. This spring accommodating hole 52 is formed as a bottomed hole extending in the axial direction and accommodates the spring member 53 therein, which will be described later.

The spring member 53 urges the brake piston 49 downward (direction getting closer to the rotating side brake disk 47 and the like) all the time. This spring member 53 is formed of an elastic member such as a compression coil spring or the like, for example, and is installed in a compressed state in the spring accommodating hole 52 of the brake piston 49. When the pressurized oil (brake release pressure) is not supplied into the brake release oil chamber 57, which will be described later, the brake piston 49 presses each of the brake disks 47 and 48 and frictionally engages them with each other by an urging force of the spring member 53. As a result, rotation of each of the rotating side brake disks 47 is regulated, and a braking force is applied to the motor shaft 25 through the adapter 44.

An annular upper seal 54 is provided on the outer peripheral side of the large-diameter cylinder portion 50A of the brake piston 49. An annular lower seal 55 is provided on the outer peripheral side of the small-diameter cylinder portion 50B of the brake piston 49. These upper seal 54 and lower seal 55 seal a space between the outer peripheral surface of the brake piston 49 (piston body portion 50) and the inner peripheral surface of the brake case 32 (piston insertion hole 35) in a liquid tight manner.

The oil seal 56 is located below the bearing 45 and provided on the outer peripheral side of the motor shaft 25 of the electric motor 21, and the oil seal 56 seals the lubricant oil 59, which will be described later, supplied into the brake case 32 with respect to the electric motor 21.

Indicated at 57 is the brake release oil chamber provided between the inner peripheral surface of the brake case 32 and the outer peripheral surface of the brake piston 49. Here, the brake release oil chamber 57 is formed annularly on the whole periphery between a corner portion between the large-diameter cylinder portion 50A and the small-diameter cylinder portion 50B of the piston body portion 50 and a corner portion between the large-diameter hole portion 35A and the small-diameter hole portion 35B of the piston insertion hole 35 and is sandwiched by the upper seal 54 and the lower seal 55 from the vertical direction. The brake release pressure inlet port 43 provided in the case body 33 communicates with the brake release oil chamber 57.

Therefore, when the pressurized oil (brake release pressure) is not supplied into the brake release oil chamber 57 through the brake release pressure inlet port 43, the brake piston 49 has each of the rotating side brake disks 47 and each of the non-rotating side brake disks 48 frictionally engaged with each other by the urging force of the spring member 53, whereby the braking force is applied to the motor shaft 25 through the adapter 44.

On the other hand, when the pressurized oil is supplied into the brake release oil chamber 57 through the brake release pressure inlet port 43, the brake piston 49 is spaced apart from the rotating side brake disk 47 and the like against the spring member 53, whereby braking to the motor shaft 25 is released.

Indicated at 58 is a brake pressure adjusting oil chamber provided between the inner peripheral surface of the brake case 32 and the outer peripheral surface of the brake piston 49, and the brake pressure adjusting oil chamber 58 is defined between the stepped portion 35C of the piston insertion hole 35 of the brake case 32 and the bottom surface 50C of the piston body portion 50 of the brake piston 49 over the whole periphery.

Here, in regard to the brake pressure adjusting oil chamber 58, a part of the lubricant oil 59 flowing into the brake case 32 from the lubricant oil inlet port 40 flows in a pressurized state through the oil groove 41. Then, by means of the lubricant oil 59 flowing into the brake pressure adjusting oil chamber 58, a force in a reverse direction to the direction in which the urging force of the spring member 53 is applied to the brake piston 49 is applied. As a result, at start of the braking and the like, application of a rapid and excessive force to each of the rotating side brake disks 47 and the non-rotating side brake disks 48 from the brake piston 49 by the urging force of the spring member 53 can be suppressed.

Subsequently, designated at 59 is the lubricant oil supplied into the brake case 32, and the lubricant oil 59 cools is heat generated by frictional engagement between the rotating side brake disk 47 and the non-rotating side brake disk 48 at the time of braking to the motor shaft 25 by lubricating each of the rotating side brake disks 47 and each of the non-rotating side brake disks 48 accommodated in the brake case 32.

Figure 6:
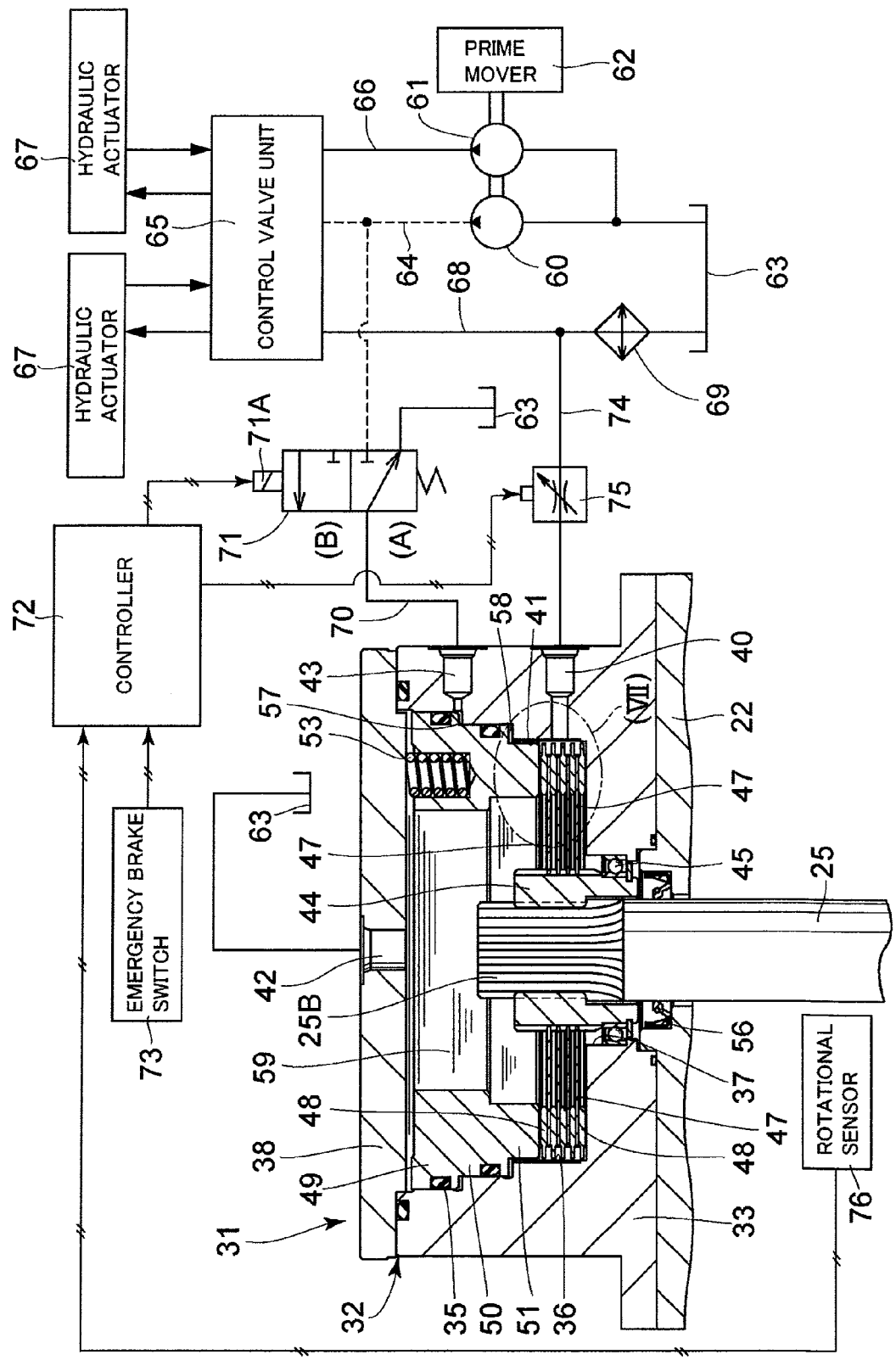
FIG. 6 is a hydraulic circuit diagram illustrating supply paths of lubricant oil and brake release pressure supplied to the wet brake device in a braking state.
Figure 7:
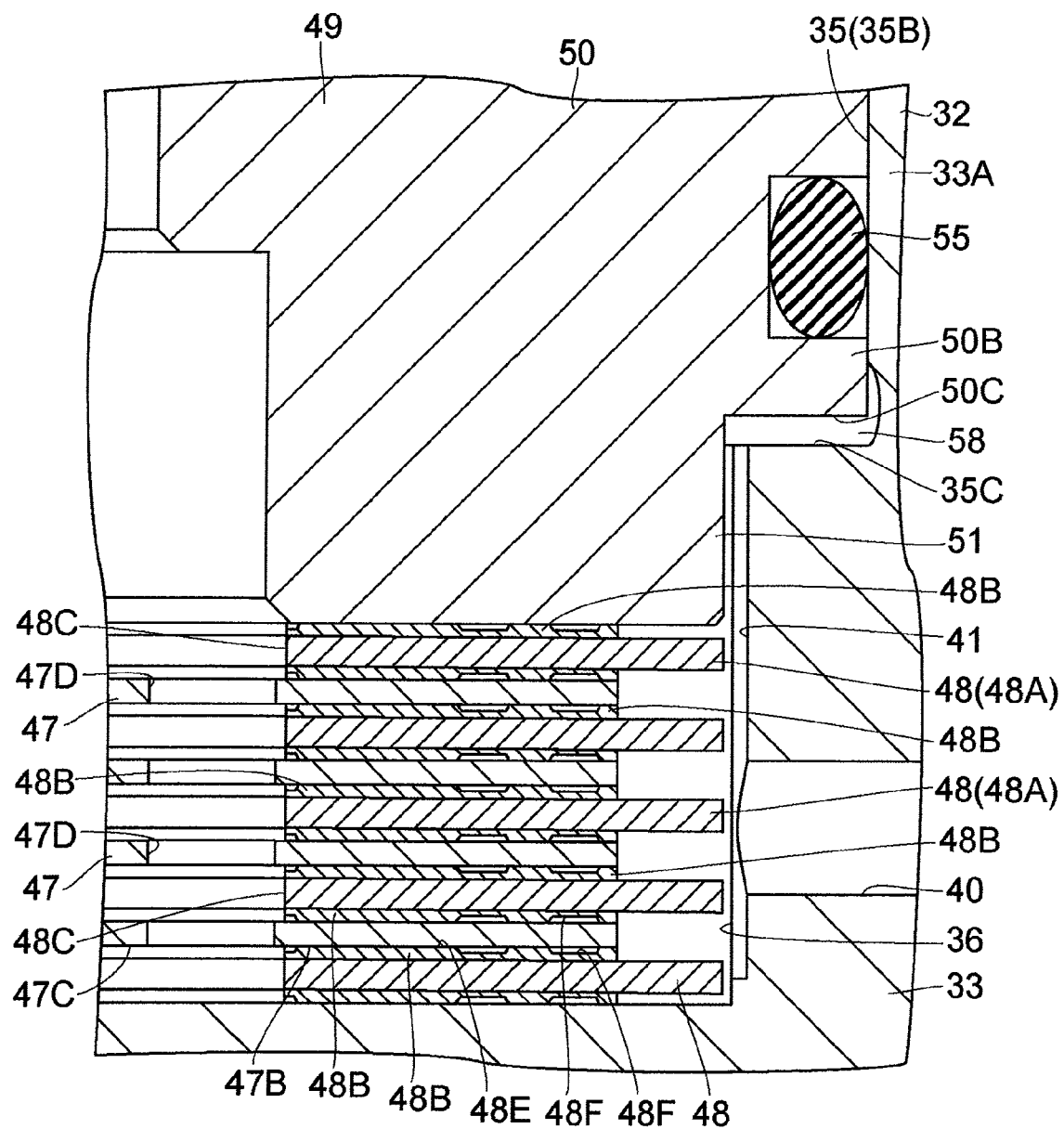
FIG. 7 is an enlarged sectional view of a (VII) part in FIG. 6 illustrating a state in which a brake case, a rotating side brake disk, a non-rotating side brake disk, a brake piston and the like are in the braking state.

Here, as illustrated in FIG. 6, in this embodiment, operating oil supplied to a hydraulic motor (not shown) for driving mounted on the lower traveling structure 2 and a hydraulic actuator 67 such as a hydraulic cylinder and the like provided on the working mechanism 4 is used as the lubricant oil 59. By setting the lubricant oil 59 flowing into the brake case 32 from the lubricant oil inlet port 40 as a return oil of the operating oil in a pressurized state driven the hydraulic actuator 67, it is configured such that this lubricant oil 59 can flow into the brake pressure adjusting oil chamber 58 in the pressurized state. Along with that, it is configured such that the lubricant oil 59 can flow from the outer diameter side to the inner diameter side in the pressurized state between each of the rotating side brake disks 47 and each of the non-rotating side brake disks 48.

Subsequently, a hydraulic circuit which supplies the pressurized oil (brake release pressure) to the brake release oil chamber 57 and supplies the lubricant oil 59 into the brake case 32 will be described with reference to FIG. 6.

In the drawing, indicated at 60 is a pilot pump mounted on the upper revolving structure 3, and indicated at 61 is a main pump. These pilot pump 60 and the main pump 61 are rotated and driven by a prime mover 62 such as an engine, an electric motor and the like and discharge the operating oil retained in an operating oil tank 63.

The pilot pressure oil discharged from the pilot pump 60 is introduced into a hydraulic pilot portion of a control valve unit 65 through a pilot line 64 and controls the control valve unit 65 in accordance with an operation to an operation device (not shown) such as an operation lever, a pedal and the like.

On the other hand, the pressurized oil discharged from the main pump 61 is introduced into the control valve unit 65 through a delivery line 66. Moreover, this pressurized oil is supplied to a desired hydraulic actuator 67 through the control valve unit 65 controlled by the operation device (not shown) such as the operation lever, the pedal and the like. On the other hand, it is configured such that the return oil from the other hydraulic actuators 67 is introduced into a cooler 69 (oil cooler) through a return line 68 from the control valve unit 65, cooled in the cooler 69 and then, returned to the operating oil tank 63.

Indicated at 70 is a brake release pressure line which makes a midway portion of the pilot line 64 communicate with the brake release pressure inlet port 43 of the brake case 32, and indicated at 71 is a brake control valve provided in the midway of the brake release pressure line 70. Here, the brake control valve 71 is made of a 3-port and 2-position solenoid valve, for example, and holds a valve position (A) when a signal is not supplied from a controller 72 to a solenoid operated pilot portion 71A and is switched to a valve position (B) when a signal is supplied from the controller 72 to the solenoid operated pilot portion 71A.

Therefore, while a signal is not supplied to the solenoid operated pilot portion 71A from the controller 72 when the hydraulic excavator 1 is stopped, for example, or while a signal is no longer supplied to the solenoid operated pilot portion 71A from the controller 72 by means of an operation (turning-on) of an emergency brake switch 73 by an operator during operation of the hydraulic excavator 1, for example, the brake control valve 71 holds the valve position (A), whereby supply of the pressurized oil to the brake release oil chamber 57 of the wet brake device 31 is stopped. As a result, as illustrated in FIG. 6, the brake piston 49 frictionally engages each of the rotating side brake disks 47 with the non-rotating side brake disks 48 by the urging force of the spring member 53, whereby the braking force is applied to the motor shaft 25.

On the other hand, if a signal is supplied from the controller 72 to the solenoid operated pilot portion 71A while the hydraulic excavator 1 is operating, the brake control valve 71 is switched to the valve position (B), whereby a part of the pilot pressure oil discharged from the pilot pump 60 is supplied into the brake release oil chamber 57 through the brake release pressure inlet port 43 of the brake case 32. As a result, as illustrated in FIG. 3, the brake piston 49 is spaced apart from the rotating side brake disk 47 and the like against the spring member 53, and frictional engagement between each of the rotating side brake disks 47 and each of the non-rotating side brake disks 48 is released, whereby braking on the motor shaft 25 is released.

Indicated at 74 is a lubricant oil line which makes the return line 68 communicate with the lubricant oil inlet port 40 of the brake case 32. One end side of this lubricant oil line 74 is connected to the midway portion of the return line 68 on the upstream side of the cooler 69, while the other end side is connected to the lubricant oil inlet port 40 of the case body 33.

Therefore, while the hydraulic excavator 1 is operating, a part of the return oil returning to the operating oil tank 63 from the hydraulic actuator 67 through the control valve unit 65 is supplied from the lubricant oil line 74 as the lubricant oil 59 into the brake case 32 through the lubricant oil inlet port 40. Here, since the lubricant oil 59 flowing into the brake case 32 from the lubricant oil inlet port 40 is the return oil of the operating oil in the pressurized state, having driven the hydraulic actuator 67, the lubricant oil 59 flows in each of the oil grooves 48F in the pressurized state from the outer diameter side to the inner diameter side between the rotating side brake disk 47 and the non-rotating side brake disk 48. This lubricant oil 59 lubricates the rotating side brake disk 47, the non-rotating side brake disk 48 and the like and then, is led out to the lid member 38 side through the through hole 47D of the rotating side brake disk 47 and the large-diameter hole 48C of the non-rotating side brake disk 48 and returned to the operating oil tank 63 through the lubricant oil outlet port 42 of the lid member 38.

As described above, in this embodiment, it is configured such that the lubricant oil 59 circulates all the time in the brake case 32 through the lubricant oil inlet port 40 of the case body 33 and the lubricant oil outlet port 42 of the lid member 38. As a result, in case the revolving operation of the upper revolving structure 3 is to be rapidly stopped by the wet brake device 31, for example, even if a large quantity of heat is generated by frictional engagement between the rotating side brake disk 47 and the non-rotating side brake disk 48, this heat can be efficiently cooled by the lubricant oil 59 circulating in the brake case 32.

On the other hand, a variable throttle 75 which limits the return oil flowing through the lubricant oil line 74 is provided in the midway of the lubricant oil line 74. This variable throttle 75 adjust a flow rate of the return oil (lubricant oil 59) flowing through the lubricant oil line 74 in accordance with a signal from the controller 72 and is configured to be able to adjust the flow rate in accordance of a rotation speed of the motor shaft 25, for example. Therefore, a detection signal of a rotational sensor 76 which detects a rotation speed of the motor shaft 25 is inputted into the controller 72.

Therefore, when the braking is released, for example, a signal which increases the flow rate of the return oil (lubricant oil 59) as the rotation speed of the motor shaft 25 becomes higher is outputted from the controller 72 to the variable throttle 75. In this way, the rotating side brake disk 47 rotating (idling) with the motor shaft 25 and the non-rotating side brake disk 48 opposed to the rotating side brake disk 47 with a slight gap can be efficiently cooled.

The wet brake device 31 according to this embodiment has the configuration as described above, and an operation thereof will be described below.

When the hydraulic excavator 1 is stopped, as illustrated in FIG. 6, the brake control valve 71 holds the valve position (A), whereby supply of the pressurized oil into the brake release oil chamber 57 of the wet brake device 31 is stopped. As a result, the brake piston 49 frictionally engages the rotating side brake disk 47 with the non-rotating side brake disk 48 by the urging force of the spring member 53. As a result, the braking force is applied to the motor shaft 25, and the upper revolving structure 3 is kept still on the lower traveling structure 2.

Subsequently, if the prime mover 62 of the hydraulic excavator 1 is operated, a signal is supplied from the controller 72 to the solenoid operated pilot portion 71A of the brake control valve 71, and the brake control valve 71 is switched to the valve position (B). As a result, a part of the pilot pressure oil discharged from the pilot pump 60 is supplied into the brake release oil chamber 57 through the brake release pressure inlet port 43 of the brake case 32. As a result, as illustrated in FIG. 3, the brake piston 49 is spaced apart from the rotating side brake disk 47 against the spring member 53, the frictional engagement between the rotating side brake disk 47 and the non-rotating side brake disk 48 is released, and the braking on the motor shaft 25 is released.

In case the motor shaft 25 of the electric motor 21 is rotated in this state, this rotation of the motor shaft 25 is reduced in three stages by each of the planetary gear reduction mechanisms 18, 19, and 20 of the reduction device 12 and transmitted to the output shaft 27, and the pinion 27B is rotated with a large rotational force (torque). The pinion 27B revolves along the inner race 5A while being meshed with the internal teeth 5D provided on the inner race 5A of the swing circle 5, and this revolving force of the pinion 27B is transmitted to the revolving frame 3A through the housing 13, thereby the upper revolving structure 3 performs the revolving operation on the lower traveling structure 2.

At this time, a part of the return oil returning to the operating oil tank 63 from various types of the hydraulic actuator 67 mounted on the hydraulic excavator 1 is supplied as the lubricant oil 59 into the brake case 32 through the lubricant oil inlet port 40 from the lubricant oil line 74. This lubricant oil 59 lubricates, cools, and washes the rotating side brake disk 47 and the non-rotating side brake disk 48 and the like and then, is led out to the lid member 38 side through the through hole 47D of the rotating side brake disk 47 and the large-diameter hole 48C of the non-rotating side brake disk 48 and returned to the operating oil tank 63 through the lubricant oil outlet port 42 of the lid member 38.

During such braking release time, the rotating side brake disks 47 of the wet brake device 31 rotate (idle) along with the motor shaft 25 of the electric motor 21, but since a frictional material is not provided on these rotating side brake disks 47, the weight of the rotating side brake disk 47 can be reduced, and drag resistance can be reduced. On the other hand, the oil groove 48F is provided in the frictional material 48B of the non-rotating side brake disk 48 which does not rotate either during braking or braking release. Thus, a centrifugal force is not directly applied to the lubricant oil 59 flowing through the oil groove 48F, and the lubricant oil 59 can be made to efficiently flow from the outer diameter side to the inner diameter side between the rotating side brake disk 47 and the non-rotating side brake disk 48.

Moreover, the lubricant oil 59 having flowed to the inner diameter sides of the rotating side brake disk 47 and the non-rotating side brake disk 48 flows in the vertical direction through the through hole 47D of the rotating side brake disk 47 and the large-diameter hole 48C of the non-rotating side brake disk 48. As a result, the lubricant oil 59 can be made to efficiently flow from the inner diameter sides of the rotating side brake disk 47 and the non-rotating side brake disk 48 toward the lubricant oil outlet port 42 of the brake case 32.

Subsequently, in the case of emergency stop of the revolving operation of the upper revolving structure 3 as in the case if the emergency brake switch 73 is operated (turned on) by the operator, for example, supply of a signal from the controller 72 to the solenoid operated pilot portion 71A of the brake control valve 71 is shut off, and the brake control valve 71 is switched from the valve position (B) to the valve position (A). As a result, supply of the pressurized oil to the brake release oil chamber 57 of the wet brake device 31 is stopped, and the brake piston 49 frictionally engages the rotating side brake disk 47 and the non-rotating side brake disk 48 by the urging force of the spring member 53, whereby a braking force is applied to the motor shaft 25, and the revolving operation of the upper revolving structure 3 can be stopped.

At this time, the return oil from various types of the hydraulic actuator 67 is supplied as the lubricant oil 59 into the brake case 32, and this lubricant oil 59 flows from the outer diameter side to the inner diameter side between the rotating side brake disk 47 and the non-rotating side brake disk 48 in the pressurized state.

In this case, since the lubricant oil 59 having flowed into the brake case 32 from the lubricant oil inlet port 40 flows from the outer diameter side to the inner diameter side between the rotating side brake disk 47 and the non-rotating side brake disk 48 only through the oil groove 48F provided in the frictional engaging surface 48E, inflow of the lubricant oil 59 to a portion other than the frictional engaging surface 48E can be prevented. Thus, by means of the lubricant oil 59 having flowed into the brake case 32 from the lubricant oil inlet port 40, the frictional engaging surface 48E of the non-rotating side brake disk 48 and the abutting portion 47B of the rotating side brake disk 47 can be actively cooled, and the frictional engaging surface 48E and the abutting portion 47B can be efficiently cooled.

The lubricant oil 59 having flowed to the inner diameter sides of the rotating side brake disk 47 and the non-rotating side brake disk 48 through the oil groove 48F is led out to the lid member 38 side through the through hole 47D of the rotating side brake disk 47 and the large-diameter hole 48C of the non-rotating side brake disk 48 and is returned to the operating oil tank 63 through the lubricant oil outlet port 42 of the lid member 38. As a result, when the revolving operation of the upper revolving structure 3 is to be rapidly stopped by the wet brake device 31, even if heat is generated by the frictional engagement between the rotating side brake disk 47 and the non-rotating side brake disk 48, this heat can be efficiently cooled by the lubricant oil 59 circulating in the brake case 32.

As described above, according to this embodiment, since it is configured such that the lubricant oil 59 flowing into the brake case 32 from the lubricant oil inlet port 40, when a braking force is applied by the brake piston 49 to the motor shaft 25, flows from the outer diameter side to the inner diameter side between the rotating side brake disk 47 and the non-rotating side brake disk 48 only through the oil groove 48F provided in the frictional engaging surface 48E of the frictional material 48B of the non-rotating side brake disk 48, the frictional engaging surface 48E can be efficiently cooled.

That is, when a braking force is applied, since the lubricant oil 59 having flowed into the brake case 32 from the lubricant oil inlet port 40 flows only through the oil groove 48F provided in the frictional engaging surface 48E, inflow of the lubricant oil 59 to a portion other than the frictional engaging surface 48E can be prevented. Thus, a large quantity of the lubricant oil 59 having flowed into the brake case 32 from the lubricant oil inlet port 40 actively cools the frictional engaging surface 48E of the non-rotating side brake disk 48 and the abutting portion 47B of the rotating side brake disk 47, and thus, the frictional engaging surface 48E and the abutting portion 47B can be efficiently cooled. As a result, durability and reliability of the rotating side brake disk 47 and the non-rotating side brake disk 48 can be ensured, and improvement of the brake performance and reliability can be realized.

According to this embodiment, since it is configured such that the lubricant oil 59 flowing into the brake case 32 from the lubricant oil inlet port 40 flows from the outer diameter side to the inner diameter side between the rotating side brake disk 47 and the non-rotating side brake disk 48 in the pressurized state, even if a centrifugal force is applied to the lubricant oil 59 with rotation of the rotating side brake disk 47, the lubricant oil 59 can be made to forcedly flow from the outer diameter side to the inner diameter side between the rotating side brake disk 47 and the non-rotating side brake disk 48 against this centrifugal force. Thus, the frictional engaging surface 48E and the abutting portion 47B can be efficiently cooled from this aspect as well, and durability and reliability can be ensured, and improvement of the brake performance and reliability can be realized.

According to this embodiment, the frictional material 48B is provided on the non-rotating side brake disk 48, and the oil groove 48F is provided in the frictional material 48B. Therefore, the centrifugal force is not directly applied to the lubricant oil 59 flowing through the oil groove 48F of the non-rotating side brake disk 48, and the lubricant oil 59 can be made to efficiently flow from the outer diameter side to the inner diameter side between the rotating side brake disk 47 and the non-rotating side brake disk 48. Thus, regardless of the rotation speed of the motor shaft 25, the cooling effect of the frictional engaging surface 48E and the abutting portion 47B by the lubricant oil 59 can be improved, and durability and reliability of the rotating side brake disk 47 and the non-rotating side brake disk 48 can be improved from this aspect as well.

According to this embodiment, the frictional material 48B is provided only on the non-rotating side brake disk 48 in the rotating side brake disk 47 and the non-rotating side brake disk 48 (the frictional material is not provided on the rotating side brake disk 47), and thus, the weight of the rotating side brake disk 47 can be reduced. Therefore, even if the motor shaft 25 is arranged in a state extending in the vertical direction in the brake case 32, drag resistance by the weight of the rotating side brake disk 47 of its own, rotating with the motor shaft 25 during brake release, can be reduced.

According to this embodiment, since it is configured such that the large-diameter hole 48C is provided at a portion on the inner diameter side of the non-rotating side brake disk 48 and the through hole 47D in the frictional material non-contact surface 47C of the rotating side brake disk 47, the lubricant oil 59 can be made to efficiently flow from the inner diameter sides of the rotating side brake disk 47 and the non-rotating side brake disk 48 toward the lubricant oil outlet port 42 through the large-diameter hole 48C and the through hole 47D.

Moreover, according to this embodiment, since it is configured such that the motor shaft 25 extends in the vertical direction in the brake case 32, the lubricant oil 59 having flowed into the brake case 32 from the lubricant oil inlet port 40 flows in the horizontal direction between the frictional engaging surface 48E of the non-rotating side brake disk 48 and the abutting portion 47B of the rotating side brake disk 47 and can efficiently cool the whole peripheries of the frictional engaging surface 48E and the abutting portion 47B.

Figure 11:
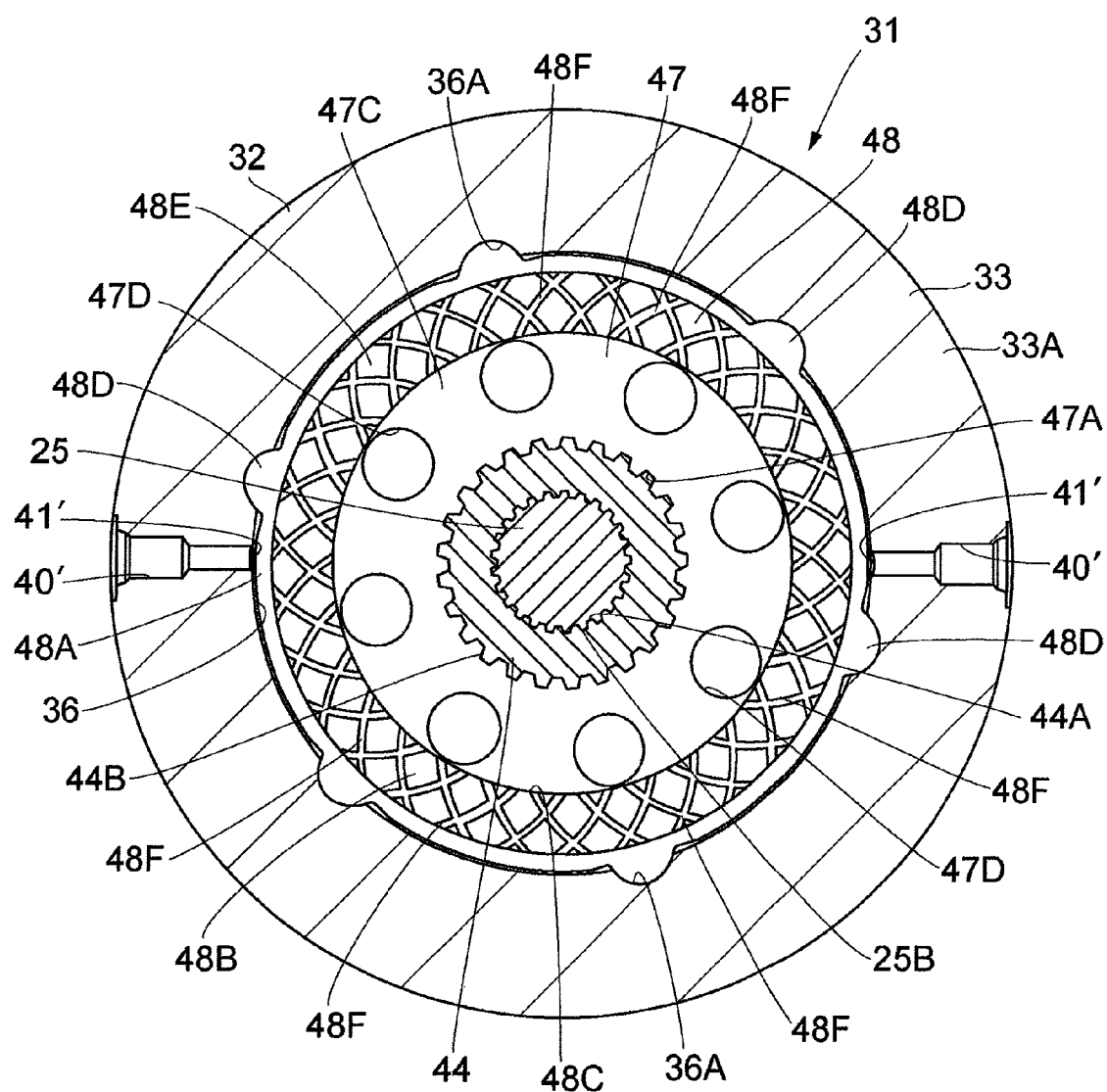
FIG. 11 is a sectional view illustrating a wet brake device according to a first modification of the present invention similar to FIG. 4.

It should be noted that in the above-described embodiment, it is explained by citing as an example the case in which the single lubricant oil inlet port 40 is provided in the case body 33 of the brake case 32. However, the present invention is not limited to the same, and a construction may be provided in which, as in a first modification illustrated in FIG. 11, two lubricant oil inlet ports 40' spaced apart by 180° in the circumferential direction in the case body 33. In this case, oil grooves 41' are preferably provided in correspondence with each of the lubricant oil inlet ports 40'.

Figure 12:
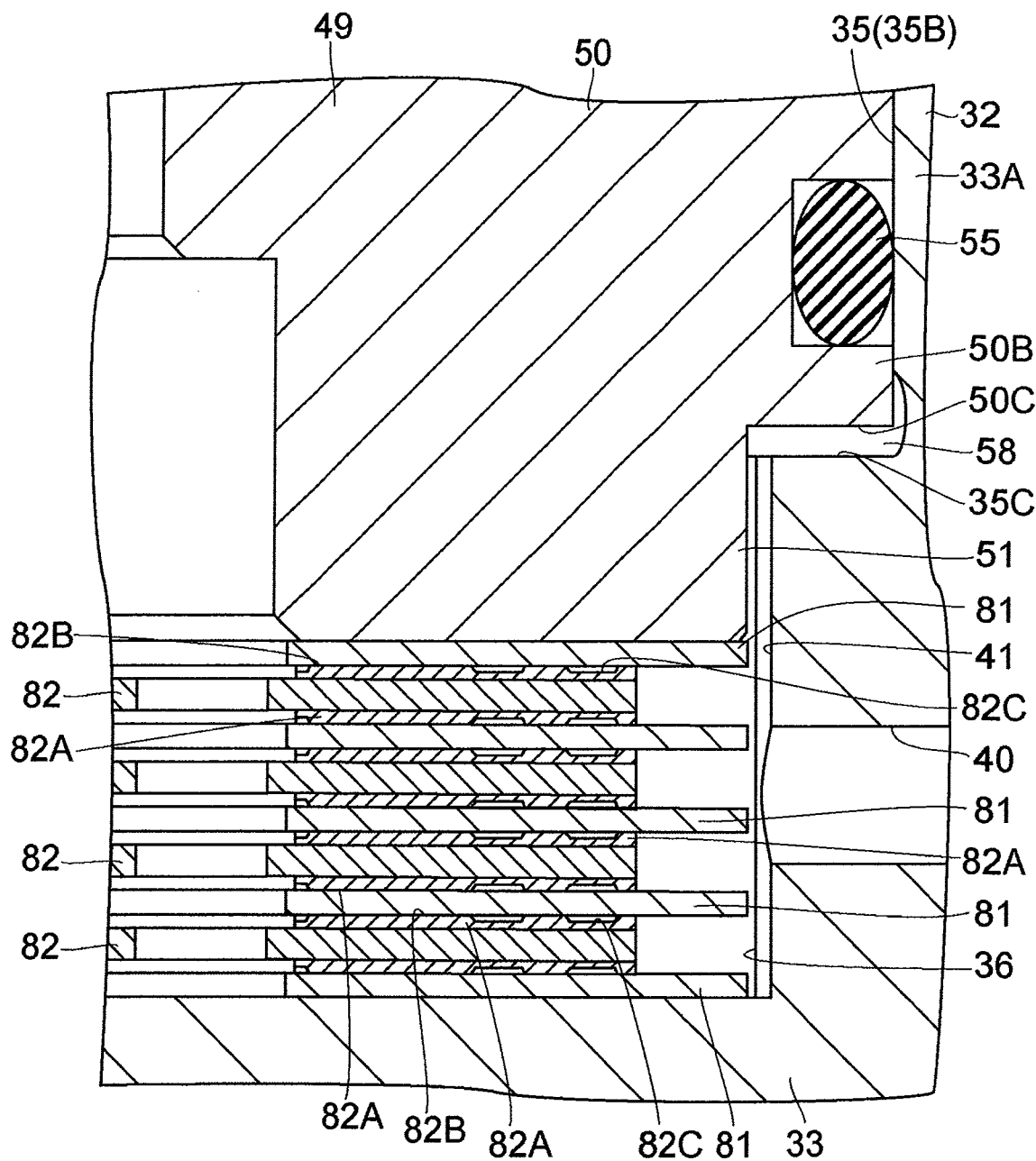
FIG. 12 is a sectional view illustrating a wet brake device according to a second modification of the present invention similar to FIG. 7.

In the above-described embodiment, it is explained by citing as an example the case in which the frictional material 48B is provided on the non-rotating side brake disk 48. However, the present invention is not limited to the same, and as in a second modification illustrated in FIG. 12, a frictional material 82A may be provided on the rotating side brake disk 82 without providing a frictional material on the non-rotating side brake disk 81, and an oil groove 82C may be formed in a frictional engaging surface 82B of this frictional material 82A. Alternatively, though not shown, the frictional material may be provided on both the non-rotating side brake disk and the rotating side brake disk. That is, it may be so configured that the frictional material is provided on at least one brake disk of the non-rotating side brake disk and the rotating side brake disk.

In the above-described embodiment, it is explained by citing as an example the case in which the oil groove 48F is provided in the frictional material 48B. However, the present invention is not limited to the same, and an oil groove may be provided on an abutting portion of the rotating side brake disk on which a frictional material is not provided, without providing an oil groove in the frictional material of the rotating side brake disk, for example. Alternatively, an oil groove can be provided in both the frictional material of the non-rotating side brake disk and the abutting portion of the rotating side brake disk. That is, it may be so configured that the oil groove is provided on at least one brake disk in the non-rotating side brake disk and the rotating side brake disk regardless of presence of the frictional material.

In the above-described embodiment, it is explained by citing as an example the case in which the oil groove 48F called "sun burst groove" inclined in an arc shape in the circumferential direction is provided in the frictional material 48B of the non-rotating side brake disk 48. However, the present invention is not limited to the same, and it is possible to adapt a configuration in which an oil groove provided linearly in the radial direction, for example, is used. That is, an oil groove having any shape may be used as long as the oil groove makes the outer diameter sides and the inner diameter sides of the rotating side brake disk and the non-rotating side brake disk communicate with each other.

In the above-described embodiment, it is explained by citing as an example the case in which, by using a part of the return oil of the operating oil having driven the hydraulic actuator 67 and in the pressurized state as the lubricant oil 59 flowing into the brake case 32, the lubricant oil 59 flows from the outer diameter side to the inner diameter side between each of the rotating side brake disks 47 and each of the non-rotating side brake disks 48 in the pressurized state. However, the present invention is not limited to the same, and it is possible to adapt a configuration in which by using a part of the pilot pressure oil introduced into the hydraulic pilot portion of the control valve unit as the lubricant oil, for example, the lubricant oil flows from the outer diameter side to the inner diameter side between each of the rotating side brake disks and each of the non-rotating side brake disks in the pressurized state. That is, the lubricant oil flowing into the brake case from the lubricant oil inlet port may be any type including the return oil of the operating oil, the pilot pressure oil and the like as long as it can be supplied into the brake case in the pressurized state.

In the above-described embodiment, it is explained by citing as an example the case in which each of the rotating side brake disks 47 is attached to the motor shaft 25 through the adapter 44. However, the present invention is not limited to the same, and it is possible to adapt a configuration in which the adapter is omitted, and each of the rotating side brake disks is directly attached to the motor shaft (be spline coupled), for example.

In the above-described embodiment, it is explained by citing as an example the case in which the wet brake device 31 is configured as a negative-type brake device in which the braking force is applied when the pressurized oil is not supplied into the brake release oil chamber 57. However, the present invention is not limited to the same, and it is possible to adapt a configuration as a positive-type brake device in which the braking force is applied when the pressurized oil is supplied into an oil chamber (brake applying oil chamber), for example.

Moreover, in the above-described embodiment, it is explained by citing as an example in which the wet brake device 31 applied to the revolving apparatus 11 of the hydraulic excavator 1. However, the present invention is not limited to the same, and it is possible to be widely applied as a wet brake device mounted on various types of mechanical devices including a wet brake device used for a revolving apparatus of other revolving-type construction machines such as a hydraulic crane and the like, for example.

DESCRIPTION OF REFERENCE NUMERALS

1: Hydraulic excavator (Construction machine)
2: Lower traveling structure
3: Upper revolving structure
5: Swing circle
11: Revolving apparatus
12: Reduction device
21: Electric motor
25: Motor shaft (Rotational shaft)
27: Output shaft
31: Wet brake device
32: Brake case
40, 40': Lubricant oil inlet port
42: Lubricant oil outlet port
47, 82: Rotating side brake disk
47A: Female spline portion (Engaging hole)
47B: Abutting portion (Outer side portion in the radial direction)
47C: Frictional material non-contact surface
47D: Through hole
48, 81: Non-rotating side brake disk
48A: Base
48B, 82A: Frictional material
48C: Large-diameter hole
48E, 82B: Frictional engaging surface
48F, 82C: Oil groove
49: Brake piston
53: Spring member
57: Brake release oil chamber
59: Lubricant oil

The invention claimed is:

1. A wet brake device comprising:
a brake case in which a rotational shaft is rotatably fitted to extend in a vertical direction in the brake case;
a plurality of rotating side brake disks arranged outside in a radial direction of said rotational shaft in said brake case and rotating together with said rotational shaft;
a plurality of non-rotating side brake disks arranged in a non-rotating state in said brake case while alternately overlapping with each of said rotating side brake disks and opposing said rotating side brake disks in the vertical direction;
a brake piston which applies a braking force to said rotational shaft by pressing said rotating side brake disks and said non-rotating side brake disks to frictionally engage with each other;
a lubricant oil inlet port provided in said brake case and into which lubricant oil flows toward outer diameter sides of said rotating side brake disks and said non-rotating side brake disks; and
a lubricant oil outlet port provided in said brake case and said lubricant oil, which is discharged from inner diameter sides of said rotating side brake disks and said non-rotating side brake disks, flows out from said lubricant oil outlet port in said brake case,
wherein one or more of said non-rotating side brake disks respectively includes:
a frictional material disposed on said non-rotating side brake disk to frictionally engage with said rotating side brake disk,
one or more oil grooves, through which said lubricant oil flows from the outer diameter sides to the inner diameter sides of said rotating side brake disk and said non-rotating side brake disk, which are disposed on said frictional material, and
a hole having a diameter larger than a shaft diameter of said rotational shaft provided in a central portion of said non-rotating side brake disk, and
said frictional material is provided on an outer portion of said non-rotating side brake disk in a radial direction thereof,
wherein one or more of said rotating side brake disks respectively includes:
an engaging hole which is provided in a central portion of said rotating side brake disk to engage with said rotational shaft,
one or more through holes through which said lubricant oil flows provided in a frictional material non-contact surface of said rotating side brake disk, where said frictional material non-contact surface is provided between said engaging hole and a portion of said rotating side brake disk which frictionally engages with said frictional material,
wherein said lubricant oil, flowing into said brake case from said lubricant oil inlet port when a braking force is applied by said brake piston to said rotational shaft, only flows from the outer diameter sides to the inner diameter sides between said rotating side brake disks and said non-rotating side brake disks through said one or more oil grooves,
wherein said lubricant oil flowing into said brake case from said lubricant oil inlet port is a part of return oil of operating oil circulating from an operating oil tank in a return line after having driven a hydraulic actuator and is in a pressurized state,
wherein a lubricant oil line which makes said return line communicate with said lubricant oil inlet port has a first end connected to said return line on an upstream side of a cooler provided on said return line, and a second end of said lubricant oil line is connected to said lubricant oil inlet port, and
wherein said lubricant oil continuously flows from the outer diameter sides to the inner diameter sides between said rotating side brake disks and said non-rotating side brake disks in the pressurized state.

2. The wet brake device according to claim 1, wherein said rotational shaft is a motor shaft of an electric motor provided on the lower side of said brake case; and
said electric motor is provided on the upper side of a reduction device which reduces rotational speed of said motor shaft.

3. The wet brake device according to claim 1, wherein said lubricant oil continuously flows from the outer diameter sides to the inner diameter sides between said rotating side brake disks and said non-rotating side brake disks in the pressurized state when the braking force is not applied by said brake piston.

* * * * *